United States Patent Office 3,544,873
Patented Dec. 1, 1970

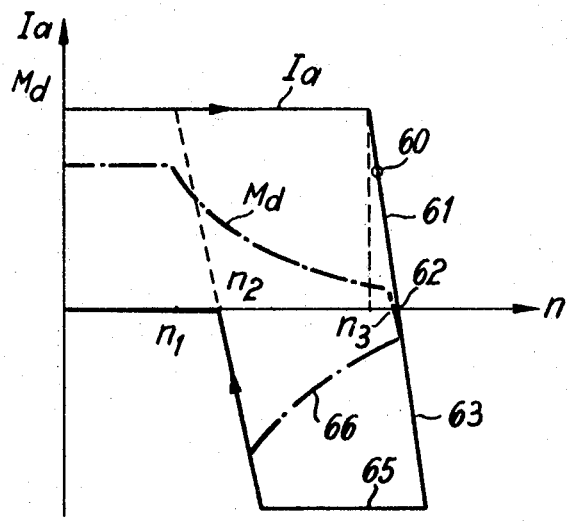
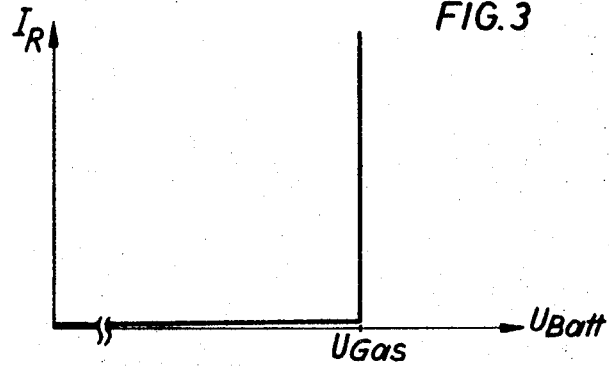

3,544,873
CONTROL SYSTEM FOR DYNAMO ELECTRIC MACHINE OPERABLE BOTH AS A MOTOR OR AS A GENERATOR WITH REGENERATIVE BRAKING
Peter Gunsser, Stuttgart, and Stefan Renner, Stuttgart-Sillenbuch, Germany, assignors to Robert Bosch G.m.b.H., Stuttgart, Germany, a limited liability company of Germany
Filed May 1, 1969, Ser. No. 820,787
Claims priority, application Germany, June 21, 1968, 1,763,541
Int. Cl. H02p *3/14*
U.S. Cl. 318—376           12 Claims

ABSTRACT OF THE DISCLOSURE

A thyristor has its pulse period determined by a control circuit to determine operating speed of the dynamo electric machine when acting as a motor; when acting as a generator, current is fed back to the supply battery bypassing the thyristor. In order to prevent over-voltages appearing at the battery, a sensing potential is derived when output voltage exceeds a predetermined value, the sensing potential causing operation of the thyristor, a dissipating resistance being connected in series with the thyristor, and isolated from the dynamo electric machine circuit by a diode which passes current in the direction of current flow when the machine operates as a motor, and blocks current (and thus diverts current through the dissipating resistance) when the machine operates in the generator mode.

---

Figure 1:
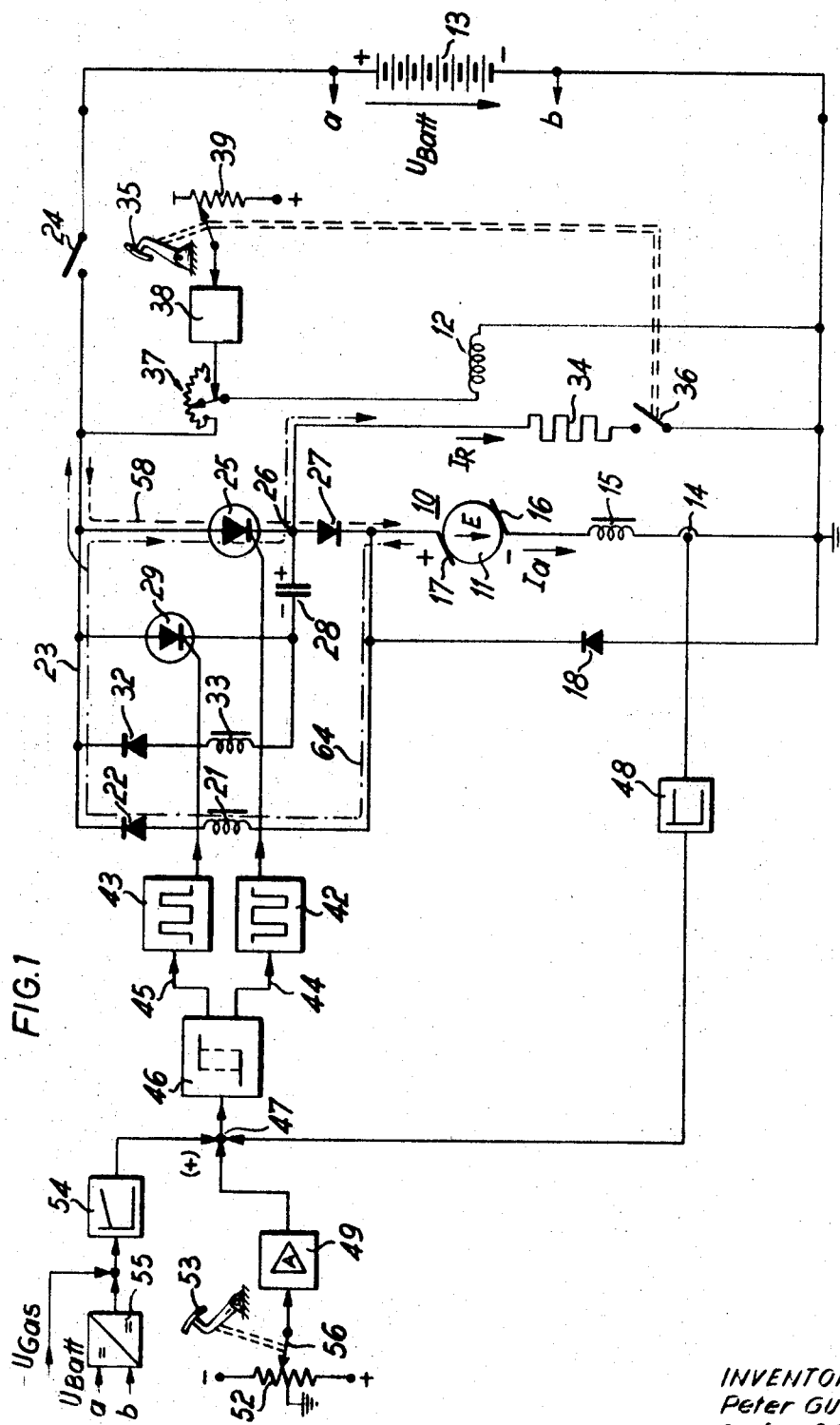

The present invention relates to a control system for dynamo electric machines capable of operating as a motor, and supplied from a direct current source such as a battery, and as a generator, and charging the battery when the machine is driven. The invention is particularly directed to such a control system in which dangerous over-voltages, possibly leading to destruction of the battery, are eliminated.

Electric battery driven vehicles usually use a lead acid battery of high capacity, serving as a source of energy, which is re-charged in more or less regular intervals. The cruising radius of such vehicles can be extended by utilizing regenerative braking, that is to feed back energy obtained from the dynamo electric machine during braking through the battery to again recharge the battery. It has been found that such regenerative braking can cause difficulties if the vehicle moves downhill along a long descent shortly after the battery has been charged. The already practically charged battery is then supplied with further electrical energy; in due course, explosive gases will be liberated by the battery, presenting a hazard, and additionally the battery may heat to such an extent that the liquids therein will begin to boil. This not only is hazardous, since explosions may result, but further is highly damaging to the battery itself and substantially increases maintenance costs thereof.

It is an object of the present invention to provide a control system for dynamo electric machines and having a regenerative braking circuit which is so arranged that the battery cannot be damaged.

Subject matter of the present invention.—Briefly, the control system for the generator includes a controlled switch, such as a thyristor, which is connected in series with the armature of the dynamo machine, to control the current thereto when operating as a motor. A switch-over device is provided effective when the dynamo electric machine is to operate as a generator, that is under regenerative braking conditions. A dissipating resistor is connected in series with the power thyristor, and parallel to the battery, and the power thyristor is then controlled to pass current from the generator through the dissipating resistance as commanded by a voltage-sensing device, which becomes effective when the battery voltage exceeds a predetermined safe value. If this predetermined, safe value is exceeded, the thyristor will be periodically controlled to become conductive and carry current from the generator to the dissipating resistance. As battery voltage increases, the portion of current flowing into the battery will become less and less. The braking effect of the dynamo electric machine is not, however, decreased since the machine will still be loaded, the current being conducted to the dissipating resistor where the energy is dissipated as heat. The operator of the vehicle thus does not have to interfere in the control process in any way; he will not, from the controls of the vehicle themselves, know whether, upon regenerative braking, current is being supplied to the battery to charge the same or the energy is dissipated in the dissipating resistance.

According to a feature of the invention, a diode, in series with the thyristor and similarly poled, passes the current through the thyristor when the dynamo electric machine is acting as a motor; upon reversal of direction of current, however, during generator operation, the diode blocks and current is diverted through the dissipating resistance. This arrangement eliminates a separate switching contact between the power thyristor and the armature of the dynamo electric machine, since the diode blocks automatically when the machine operates as a generator; wear and tear, and maintenance of contacts carrying heavy load current is thus avoided.

Battery voltage is preferably sensed by a voltage regulator which is, according to a feature of the invention, so adjusted that when the gassing potential of the battery is reached, it provides a signal which overrides the ordinary control signals applied to a controller for the thyristor. For an ordinary lead-acid battery, the gassing voltage will be approximately 2.4 to 2.45 volts per cell. The gassing voltage is preferably connected as a third input to a comparator, in which commanded armature current, and actual armature current are compared during motor operation; during generator operation, the comparator can be so arranged that the gassing-voltage sensing device becomes effective when a certain, predetermined value applied to the comparator is exceeded.

The invention will be described by way of example with reference to the accompanying drawings, wherein:

FIG. 1 is a schematic circuit diagram, omitting non-essential elements, and explaining the circuit of the present invention; and FIGS. 2 to 9 are graphs illustrating current versus speed (FIG. 2), battery voltage (FIG. 3) and time (FIGS. 4 to 9) relationships desirable for an understanding of the present invention.

The control system of the present invention is particularly suitable for use in vehicles such as buses or the like, but may be used to drive any kind of a vehicle in which energy is recovered during regenerative braking, for example in connection with aerial tramways, loading shuttles, and the like. The dynamo electric machine used in the present invention is schematically indicated as a direct current machine 10 having an armature 11 and a shunt field 12. Machine 10 is coupled to the wheels of the vehicle, or other driven and driving device. A battery 13 supplies energy to dynamo electric machine 12 when operating as a motor. A suitable battery voltage, indicated as $U_{Batt}$ may be, for example, 380 v. The negative terminal of battery 13 is connected to chassis, or ground, to which also one terminal of shunt field 12 is connected. Armature 11 is connected over a brush 16 to a choke 15 to chassis. A current sensing transducer 14 is inserted in the connection from the brush 16 through the choke 15 to chassis, so that the armature current $I_a$ through the dynamo electric machine can be measured and a signal representative of such current be obtained from transducer 14. The other brush 17 of the dynamo electric machine 10 is connected to the cathode of a free-wheeling diode 18, the anode of which is likewise grounded. Brush 17 connects to a choke 21, the anode of a diode 22, the cathode of which is connected to a positive bus 23. Positive bus 23 is connected over a switch 24 to the positive terminal of the battery 13. Diode 22 is used only when machine 10 is operating as a generator, that is regeneratively.

Positive bus 23 connects to the anode of a power thyristor 25; the cathode of power thyristor 25 connects to a junction 26 which in turn is connected to the anode of a diode 27, the cathode of which is connected to the brush 17 of machine 10. Junction 26 further connects to a condenser 28 and then to the cathode of second thyristor 29, the anode of which likewise connects to the positive bus 23. A further diode 32 has its cathode connected to positive bus 23, its anode to a choke 33 and again to the cathode of thyristor 29.

Junction 26 additionally connects to a heat dissipating resistance 34, used to dissipate energy when the dynamo electric machine is acting as a generator, and the battery should not be charged further. The other terminal of dissipating resistance 34 is connected to a switch 36, coupled to the brake pedal, or braking control of the vehicle, or other operating device, and then to ground or chassis.

Field winding 12 of the dynamo electric machine 10 is connected over field controller 37 with positive bus 23. Field controller 37, in actual practice, may be either a potentiometer or itself may be a thyristor-controlled current supply. The thyristor-controlled current supply may be constructed to be similar to the control for thyristor 25, as will be explained below, which controls current through armature 11. The setting of field controller 37 is determined by a control 38 which, in turn, is regulated by voltage derived from a fixed source applied to a potentiometer 39, the setting of which is determined by the brake pedal 35. Controller 38 may have additional signals applied thereto (not shown) to reduce the field current in field 12 when the speed of the machine is at certain determined levels, as will be explained below in connection with the diagrams of FIG. 2. Such additional control is known and therefore not illustrated.

The thyristors 25, 29, together with condenser 28, form a commutating power supply which is so arranged that either one of the two thyristors is always off. The thyristors are switched on, or fired, by pulse sources 42, 43, respectively. Pulse sources 42, 43 are so arranged that they are interlocked and have outputs only when the input of the respective pulse source has a triggering or control signal applied thereto, schematically indicated at 44, 45. The control signals 44, 45 are derived from an interlock circuit 46, which may, for example, be a flip-flop, and delivering output enabling, or trigger signals to one, or the other pulse sources 42, 43 only. Change-over between the two signals 44, 45 may occur at the frequency of several hundred Hz. when the control system is actually operating.

The thyristor 25 is thus actually controlled by the input applied to circuit 46; it is derived from a comparator 47, schematically indicated only, which has three inputs applied thereto: (1) a signal derived from transducer 14, and applied over a circuit 48 which normalizes the signal from transducer 14 to be useful for comparison with the other inputs; (2) a signal derived from a potentiometer 52 and applied over an amplifier-equalizer network 49, likewise normalizing the output derived from potentiometer 52 for comparison; potentiometer 52 has a slider 56 which is controlled by a speed controller 53, for example the speed control pedal of a vehicle. Potentiometer 52 is center-tapped and connected between a source of positive and negative potential as shown; (3) a signal derived from a regulator 54 which has, as its input, a signal representative of the voltage at which battery 13 will become gassy applied thereto, and indicated as $U_{Gas}$, and which is compared over a normalizing circuit 55 with the actual output voltage of the battery $U_{Batt}$ of the battery 13; the voltage $U_{Batt}$ is applied at a pair of inputs $a$, $b$, and taken from similarly labelled terminals, $a$, $b$, across the battery.

In normal rest position of the speed controller 53, the tap 56 on potentiometer 52 is so arranged that it is in the region of negative values, applying a potential of for example $-6$ v. to comparator 47. During operation, the tap 56 is set to move into the region of positive value which may, for example, at maximum desired current in armature 11, provide an output of $+3$ v. to the comparator 47. The normalizing element 48 is then so arranged that in ordinary motor mode of operation, that is when the current through armature 11 is in the direction shown by the arrow next to $I_a$, a comparison voltage of $-3$ v. is provided at the comparator 47; during braking, however, the current will reverse and the signal at comparator 47 may rise to $+3$ v. The highest output voltage provided by regulator 54 is $+6$ v.

Operation.—Upon starting, current through field 12 is set at full value. Pedal 53 is operated in a direction to move slider on potentiometer 52 in positive direction. Since, at rest, no current will flow through armature 11, the output of transducer 14 is zero; as a result, circuit 46 will have a positive input signal, activating circuit 42, which will supply firing pulses to thyristor 25. Thyristor 25 will become conductive, current $I_a$ will flow through the armature and motor 10 will begin to rotate, moving the vehicle.

Let it be assumed that condenser 28 is so charged that its left electrode is positive and its right electrode negative; a current will circulate from condenser 28 over choke 33, diode 32, and thyristor 25, and having a wave shape of half a sine wave, since choke 33 and condenser 28 together form a series resonance circuit. Diode 32 blocks the next half wave, so that at the end of the first half wave, the condenser will be so charged as indicated in FIG. 1, that is left electrode negative, right electrode positive. Current $I_a$ in armature 11 will increase exponentially, the increasing exponential function being detemined by the inherent resistance of the armature winding and the inductivity of the armature as well as that of choke 15. This causes the voltage at the output of normalizing element 48 to become negative, so that element 46, after a certain period of time (for example 2 msec.) will change over, turning off pulse source 42 and instead turning on pulse source 43. This causes conduction of thyristor 29. Due to the charge on condenser 28, the cathode of the thyristor will be more negative than the cathode of thyristor 25, and current $I_a$ will now pass through thyristor 29, causing blocking of thyristor 25. Current has thus commutated from thyristor 25 to thyristor 29. Condenser 28 will discharge through armature 11; this causes thyristor 29 to charge the condenser 28 and this time with reverse polarity, so that its left electrode will become positive and its right electrode negative again reaching the initially assumed starting position. Due to the self-inductance of armature 11 and the energy stored in choke 15, armature current $I_a$ will continue to flow, the circuit closing over the diode 18. When this current, which of course also flows through transducer 14, has dropped sufficiently, circuit element 46 again switches over and the previously described cycle will repeat.

Figure 4:
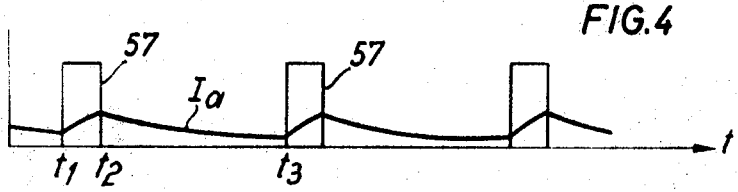
Figure 5:
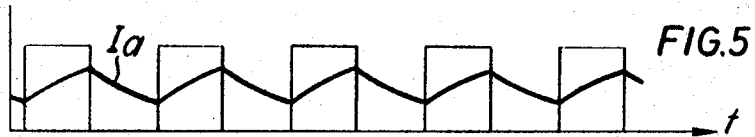
Figure 6:
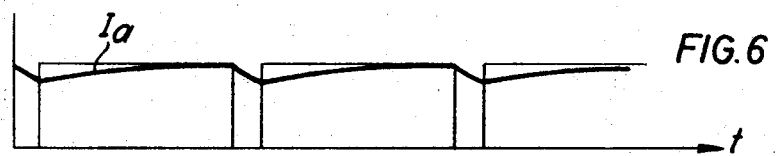

FIG. 4 graphically illustrates the resulting current pulses upon starting. The narrow rectangles 57 illustrate, between time periods $t_1$ and $t_2$, that period of time during which the thyristor 25 is conductive, $t_1$ indicating conduction and $t_2$ extinction of thyristor 25. Current rises exponentially from $t_1$ to $t_2$, at which time thyristor 29 will be turned on, extinguishing thyristor 25; this causes exponential drop of the current through armature 11, as illustrated by the curve $I_a$. At point $t_3$, thyristor 25 is again fired and the cycle repeats. The average value of curent $I_a$ is rather small; the graphs of FIGS. 5 and 6 illustrate current flow during longer duty cycles. As seen, the average current will be higher in FIG. 5, and still higher in FIG. 6. The relative time during which thyristors 29, or 25 are conductive, will thus determine average current through armature 11. The duty cycle illustrated in FIG. 5 would correspond to a 50% on, 50% off time of the thyristor 25; FIG. 4 represents a duty cycle of approximately 17.5% on; FIG. 6 of approximately 87% on. The commanded value, as determined by the position of controller 53 and the load on the motor will determine the duty cycle of the thyristor. For example, if dynamo electric machine, operating as a motor, has its rotor blocked, the duty cycle will be approximately in the 50% range; current $I_a$ will be connected and interrupted rapidly, for example at a frequency of 400 Hz. If, for example, machine 10 (in the motor mode of operation) is running freely, that is idling, then the duty cycle will be only a few percent since armature 11 requires only short current pulses in order to maintain its rotation. The current flowing from battery 13 to the machine 10 and through its armature is indicated by broken line 58 in FIG. 1.

The graph of FIG. 2 illustrates the current $I_a$ and torque $M_d$ of machine 10 with respect to speed of rotation of machine 10, $n$. Up to speed $n_1$, current through field 12 is held at a constant, and maximum value. Armature voltage E increases with increasing speed $n$ approximately linearly, and torque $M_d$ remains constant within this speed range. Above speed $n_1$, current in field 12 decreases (field attenuation) and speed increases further. The field attenuation is controlled by means, not shown, which maintain armature current constant and which are known by and of themselves. Torque $M_d$ decreases, as seen by the chain-dotted line in FIG. 2. Machine 10, depending on load and field attenuation, will reach a certain working point, for example 60, in FIG. 2. FIG. 2 illustrates the condition with maximum possible field attenuations; upon change of the field attenuation, different working points at lower speeds can be commanded.

If the vehicle operator desires to brake the vehicle, current is increased in field 12, causing an increasing in voltage E at armature 11. Current through the armature 11 $I_a$ will decrease, as indicated in section 61 of the graph in FIG. 2. When the voltage E is approximately equal to the voltage of the battery $U_{Batt}$, no current $I_a$ will flow. This corresponds to point 62 in the graph of FIG. 2. If current through field 12 further increases, the direction of current in the armature 11 will reverse, as illustated by the portion 63 of the graph in FIG. 2. This current will flow over choke 21 and diode 22 to battery 13 to charge the battery; this current path is indicated in FIG. 1 by chain-dotted line 64. Charging the battery 13 increases battery voltage $U_{Batt}$. Simultaneously, the speed of the armature, that is of the machine 10, will decrease. Initially, in spite of decreasing speed, the current will be controlled to remain essentially constant, as indicated by the portion of the graph at 65 (FIG. 2). When speed $n_2$ is reached, the current will drop to zero. The speed $n_2$ is determined by the allowable current in field 12. If a high field current is permissible, that is if the machine can be superexcited, $n_2$ will be small. In the region of speed above $n_2$, the dynamo electric machine 10 will act as a generator and the vehicle can be decelerated by regenerative braking. Braking torque is illustrated by the portion of the graph 66 (FIG. 2).

During braking, controller 53 will be in quiescent or zero position so that, as previously described, the tap point 56 will supply to comparator 47 a voltage of $-6$ v. Transducer 14 continues to supply to the comparator 47 a comparison voltage; with maximum armature current (that is portion of curve 65 in FIG. 2) this will be approximately $+3$ v. The regulator 54 will, initially, supply zero v. Element 46 thus has a negative input voltage and remains blocked. This causes blocking of thyristor 25 and no current will flow through dissipating resistance 34, although switch 36 is closed due to operation of brake pedal 35.

Figure 7:
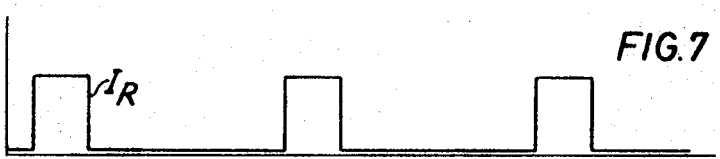
Figure 8:
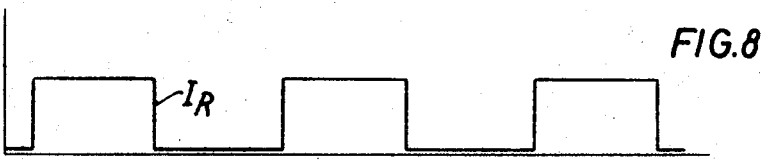
Figure 9:
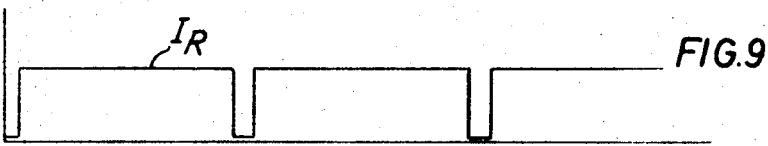

If the vehicle descends after the battery has been freshly charged, the additional charge to the battery may have the effect that a battery gassing voltage $U_{Gas}$ is reached. Regulator 54 will now become active, and provide a voltage between 0 and 6 v. to comparison device 47. This causes turn-on of element 46, since the voltage from regulator 54 together with the voltage derived from transducer 14 over regulator 48 will exceed the voltage obtained from tap point 56 as normalized by element 49. This causes turn-on of pulse generator 42, causing thyristor 25 to become conductive. Current will then flow from positive bus 23 to the dissipating resistance 34, causing drop of the battery voltage $U_{Batt}$, which, in turn, causes a drop in the output voltage of voltage regulator 54. When the voltage from voltage regulator 54 has dropped below the level which maintains flip-flop 46 in the condition rendering pulse generator 42 active, pulse generator 43 will be activated causing conduction of thyristor 29 and extinction of thyristor 25, as previously described. The battery voltage will again increase and the flip-flop 46 will again cause turn-on of pulse source 42, and with it, thyristor 25 when the voltage $U_{Gas}$ is reached, at which time current will again flow over dissipating resistance 34. The cycle will continue constantly; the proportion of the current $I_R$ flowing over dissipating resistance 34 will depend on the amount of energy to be dissipated and the condition of charge of battery 13, as illustrated in the graph of FIG. 3 in which current $I_R$ is drawn as a function of battery voltage $U_{Batt}$. FIGS. 7 to 9 illustrate the current flow, on a time basis, as the battery voltage $U_{Batt}$ increases. As soon as the gassing voltage $U_{Gas}$ is reached, some of the current for example 24%, generated by machine 10 will flow over the resistance 34; 76% will flow to battery 13 (FIG. 7). As battery voltage increases, for example as illustrated in FIG. 8, the ratio of current through the dissipating resistance to that flowing through the battery may be about 50:50; upon further increase, as seen in FIG. 9, the ratio may be 10% to the battery and 90% to the dissipating resistance, which will convert the energy into heat. The amount of total braking current can be regulated by the braking pedal or controller 35 and, automatically, determines the distribution of regenerative current flow between the resistance 34 and battery 13.

The present invention thus provides a control system utilizing only few additional components in which a battery in a regenerative charging circuit can be protected, and still full use can be made of regenerative braking, the amount of energy being dissipated in a dissipating resistance being determined by the charge condition on the battery itself. It is not necessary to break the connection between junction 26 and the brush 17 of the armature of the generator, since a diode 27 is used which permits current flow during motor operation, but blocks current flow through the thyristor during generator operation. If the normal voltage drop through diode 27 should interfere with operation, a switch synchronized with switch 36 can be used, the switch being closed during motor operation and opening during generator operation. Diode 22 may, also, be replaced by a switch which is controlled by the brake pedal, and is open during motor operation, closing when regenerative braking is desired.

Current regulator 46, as well as thyristors 25, 29 are utilized both during motor operation, as well as during regenerative braking, determining the amount of current which is being dissipated. Thus, the circuit of the present invention utilizes the same components already present in most regenerative braking-type circuits without requiring many additional components. Regulator 54 can readily be so designed that the battery voltage can be accurately controlled to a predetermined value. The flip-flop circuit 46 can be replaced by a separate controller of similar effect, such as a threshold switch, in order to control the action of thyristors 25 and 29 during braking operation.

The regulator element 54 is preferably of the binary output type, that is, provides a predetermined maximum output signal upon deviation of the input above a threshold value, A "proportional-plus-integral" control network in element 54 has such a transfer function.

The present invention has been described in connection with a regenerative braking system for electrically driven vehicles; various changes and modifications may be made within the inventive concept to adapt the system to specific uses.

What is claimed is:

1. For combination with a dynamo electric machine (10) operable both in motor and generator modes, and a battery (13) delivering power during motor mode of operation and being charged regeneratively during generator mode of operation, a control system for said machine including a power thyristor (25) through which current flows from the battery to the dynamo electric machine during motor operation.

means (35; 53) to control the mode of operation of the machine and providing a command signal;

means (14) sensing armature current ($I_a$) through the armature of the machine and supplying a sensing signal;

a current regulator (46) controlling conduction of said thyristor in dependence on said sensing signal and on said command signal;

and a dissipating resistance means (34) capable of dissipating power generated by said dynamo electric machine when operating in the generator mode;

said control system being characterized by a switch-over circuit (36) included in said means to control the mode of operation of the machine and connecting said dissipating resistance means (34) in circuit with the machine when in generator mode of operation;

means (55, 54) sensing output voltage of said machine during generator mode of operation and supplying an overvoltage signal when said voltage exceeds a predetermined value;

and means additionally controlling said power thyristor by said overvoltage signal to render said power thyristor conductive and by-pass current delivered from said dynamo electric machine to said dissipating resistor instead of said battery upon presence of said overvoltage sensing signal.

2. Control system according to claim 1, wherein the armature (11) of the dynamo electric machine (10) is connectable in a series circuit including the power thyristor (25) and in circuit with the battery (13);

and a switch (22) is provided parallel to the power thyristor to form a circuit path for current from the machine during generator mode of operation.

3. Control system according to claim 2, wherein said switch is a first diode (22) poled to pass current during generator mode of operation of the machine and to block current flow during motor mode of operation.

4. Control system according to claim 2, including a second diode (27) connected in the series circuit between the power transistor (25) and the armature (11) and connected in like polarity as the thyristor to pass current flowing through the thyristor, said switch (22) being connected at the junction of said second diode and the armature; and the dissipating resistance means being connected at the junction (26) of said second diode and the power thyristor, said second diode forming a path for current from the battery through the thyristor during motor operation but blocking current flow therethrough during generator operation and permitting by-pass of current through said dissipating resistance in accordance with conduction of said thyristor.

5. Control system according to claim 4, wherein said switch is a first diode (22) oppositely poled with respect to said diode and passing current during generator mode of operation of the machine and blocking current during motor mode of operation.

6. Control system according to claim 1, wherein said means (54, 55) sensing output voltage of said machine is connected to said battery and senses battery voltage, said predetermined value being just below the voltage at which the battery becomes gassy, said over-voltage signal being supplied by said sensing means to said current regulator to render said power thyristor conductive and by-pass current through the dissipating resistance before damage to the battery can result.

7. Control system according to claim 1, wherein said means (47) additionally controlling said power thyristor includes a comparator having a command input (52, 53, 56, 49), said command input providing a signal representative of commanded operating conditions for said machine; a feedback input (14, 48) having said sensing signal applied thereto representative of armature current ($I_a$) of the machine; and a third input having said over-voltage signal applied thereto.

8. Control system according to claim 7, wherein said command input provides, during generator mode of operation, a command signal which, relative to said sensing signal inhibits control of said power thyristor in the absence of an over-voltage signal.

9. Control system according to claim 1, wherein said means sensing output voltage (54) includes a voltage regulator having proportional-plus-integral action.

10. For combination with a dynamo electric machine (10) operable both in motor and generator modes and a battery (13) delivering power during motor mode of operation and being regeneratively charged during generator mode of operation, a control system for said machine including a power thyristor (25) through which current flows from the battery to the dynamo electric machine during motor mode of operation, means (35, 52, 53) to control the mode of operation of the machine and supplying a command signal;

means (14) sensing armature current ($I_a$) and supplying a sensing signal;

a comparator (47) comparing said command signal and said sensing signal and providing a control signal;

a regulator (46) controlling conduction of said thyristor in dependence on said control signal;

and a dissipating resistance means (34) capable of dissipating power generated by said dynamo electric machine when operating in the generator mode of operation;

said control system being characterized by the improvement comprising means (55, 54) sensing output voltage of said machine and supplying an over-voltage signal when said output voltage exceeds a predetermined value ($U_{Gas}$) and delivering an excess voltage signal, said excess voltage signal being additionally applied as a further input to said comparator (47) in a direction to cause an output control signal from said comparator controlling said thyristor to become conductive;

and means (36, 27) operable during the generator mode of operation establishing a circuit from said power thyristor through said dissipating resistance and disabling the circuit from said power thyristor through the armature of the machine.

11. Control system according to claim 10, wherein the machine includes a deceleration control and wherein said means establishing a circuit from the power thyristor through said dissipating resistance includes a switch coupled to said decelerating control and connecting said means disabling the circuit from said power thyristor and across said battery.

12. Control system according to claim 10, wherein said menas disabling the circuit from said power thyristor through the armature of said machine includes a diode connected in series with the power thyristor and the armature and poled to pass current in the direction of armature current flow during motor mode of operation only.

References Cited

UNITED STATES PATENTS

| | | | |
|---|---|---|---|
| 3,271,649 | 9/1966 | Jurgensen | 318—376 |
| 3,365,642 | 1/1968 | Risberg | 318—376 |

BENJAMIN DOBECK, Primary Examiner

U.S. Cl. X.R.

318—434